(12) United States Patent
Scotti et al.

(10) Patent No.: US 9,181,999 B2
(45) Date of Patent: Nov. 10, 2015

(54) CALIPER BODY OF A DISC BRAKE

(75) Inventors: Fabio Scotti, Bergamo (IT); Armando Puddu, Bergamo (IT); Antonio Gotti, Bergamo (IT)

(73) Assignee: FRENI BREMBO S.p.A., Curno (Bergamo) (IT)

( * ) Notice: Subject to any disclaimer, the term of this patent is extended or adjusted under 35 U.S.C. 154(b) by 163 days.

(21) Appl. No.: 13/808,286

(22) PCT Filed: Jul. 5, 2011

(86) PCT No.: PCT/IB2011/052962
§ 371 (c)(1),
(2), (4) Date: Mar. 13, 2013

(87) PCT Pub. No.: WO2012/004736
PCT Pub. Date: Jan. 12, 2012

(65) Prior Publication Data

US 2013/0213747 A1     Aug. 22, 2013

(30) Foreign Application Priority Data

Jul. 5, 2010   (IT) .............................. MI2010A1238

(51) Int. Cl.
| F16D 65/00 | (2006.01) |
| F16D 55/228 | (2006.01) |
| F16D 55/00 | (2006.01) |
| F16D 121/02 | (2012.01) |

(52) U.S. Cl.
CPC .......... *F16D 65/0075* (2013.01); *F16D 55/228* (2013.01); *F16D 2055/002* (2013.01); *F16D2121/02* (2013.01); *F16D 2250/00* (2013.01); *F16D 2250/0007* (2013.01); *F16D 2250/0092* (2013.01)

(58) Field of Classification Search
CPC ............. F16D 55/228; F16D 2055/002; F16D 2055/005; F16D 2055/0091; F16D 2055/0016
USPC ............................................ 188/73.31, 18 A
See application file for complete search history.

(56) References Cited

U.S. PATENT DOCUMENTS 3,183,999 A    5/1965 Buyze et al.

(Continued)

FOREIGN PATENT DOCUMENTS

DE       39 21 346 A1    1/1991

(Continued)

OTHER PUBLICATIONS

International Search Report and Written Opinion in PCT/IB2011/052962 mailed Oct. 7, 2011, 14 pages.

*Primary Examiner* — Vishal Sahni
(74) *Attorney, Agent, or Firm* — Thomas|Horstemeyer, LLP

(57) ABSTRACT

The invention illustrates a caliper body (1) for a disc brake, suitable for being arranged astride of a disc (40) for a disc brake, said disc (40) defining a first braking surface (41) and a second braking surface (42) opposite the first braking surface (41); said caliper body (1) comprising a first half-caliper (2) and a second half-caliper (3), which are obtained by casting without machining and are suitable for being connected together at respective contact surfaces (4', 4") defining a joining plane (P) of the half-calipers; said first half-caliper (2) comprising a wheel-side elongated portion (5), extending in a tangential direction, which is suitable for facing an axially inner surface thereof towards the first braking surface (41), and at least one first projecting portion (11), projecting in an axial direction provided with a first contact surface (4') suitable for connecting with the second half-caliper (3); said second half-caliper (3) comprising a vehicle-side elongated portion (6), extending in a tangential direction, which is suitable for facing an axially inner surface towards the second braking surface (42), an attachment portion (7) suitable for being connected to a support for the caliper and at least one second projecting portion (12), projecting in an axial direction provided with a second contact surface (4") suitable for connecting with the first half-caliper (2); the first projecting portion (11) and the second projecting portion (12) being suitable for being connected together at the respective contact surfaces (4', 4") so as to form at least one bridge astride of the disc (40); each of said first projecting portion (11) and said second projecting portion (12) being provided with a radially inner surface (13', 13") suitable for facing the disc (40) that forms an angle α of between 90° and 92° with the respective contact surface (4', 4"); in which the first projecting portion (11) extends farther in the axial direction with respect to the second projecting portion (12) so that said half-caliper joining plane (P) is axially closer to the vehicle-side elongated portion (6) with respect to the wheel-side elongated portion (5).

9 Claims, 5 Drawing Sheets

(56) References Cited

U.S. PATENT DOCUMENTS

| | | | |
|---|---|---|---|
| 3,611,988 A * | 10/1971 | Hess | 188/72.5 |
| 3,708,043 A * | 1/1973 | Rath et al. | 188/73.46 |
| 4,068,744 A * | 1/1978 | Markert | 188/73.39 |
| 6,347,689 B1 | 2/2002 | Ohishi | |
| 8,348,030 B2 * | 1/2013 | Alamin et al. | 188/370 |

FOREIGN PATENT DOCUMENTS

| | | |
|---|---|---|
| EP | 2 022 999 | 11/2009 |
| GB | 842 913 A | 7/1960 |
| GB | 1527844 * | 10/1978 |
| GB | 2 233 411 A | 9/1991 |
| WO | WO 2005078306 | 8/2005 |

* cited by examiner

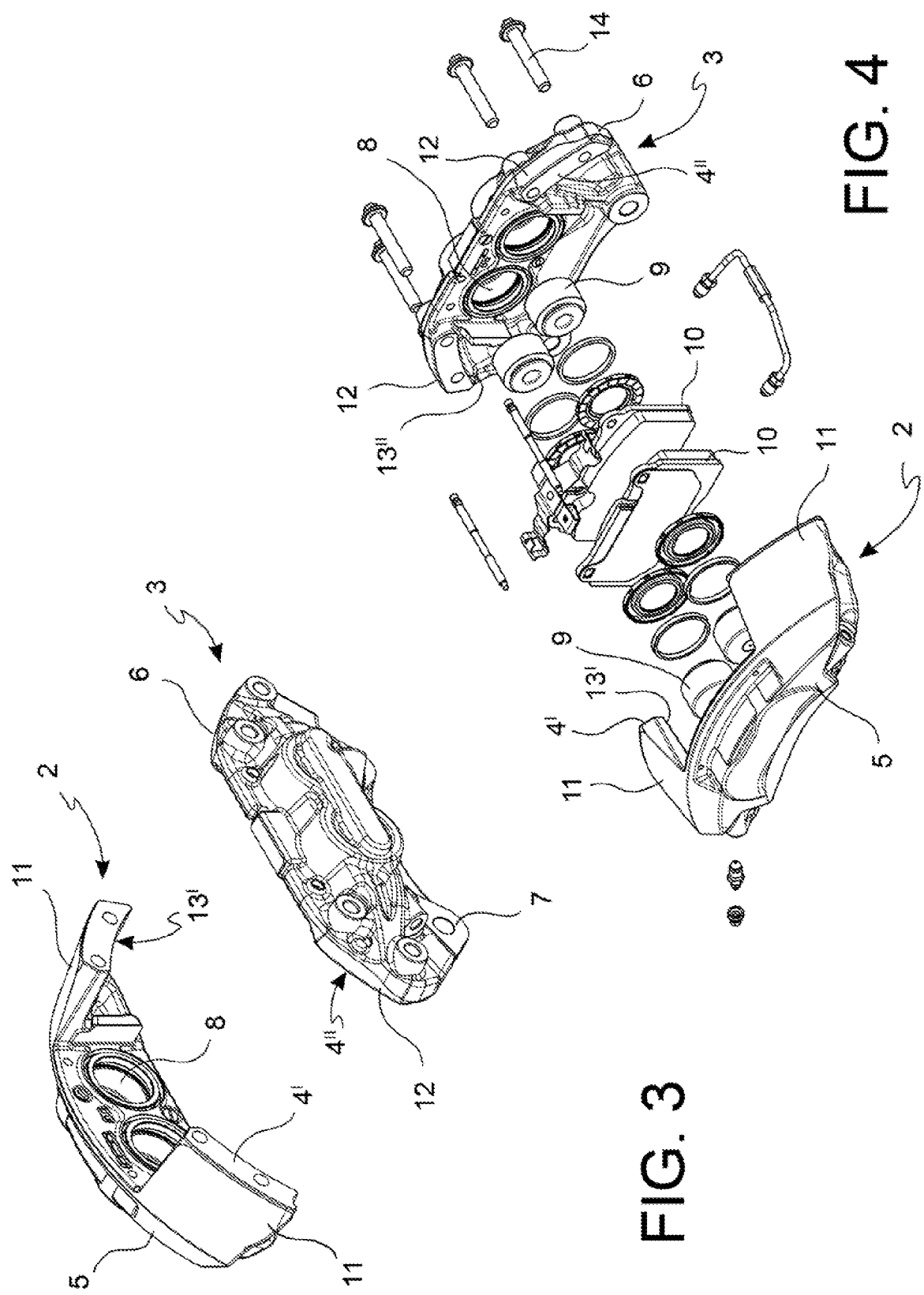

CALIPER BODY OF A DISC BRAKE

CROSS-REFERENCE TO RELATED APPLICATION

This application is the National Stage of International Application No. PCT/IB2011/052962, filed Jul. 5, 2011, which claims the benefit of MI2010A001238, filed Jul. 5, 2010, the contents of which are incorporated by reference as if fully set forth herein.

FIELD OF THE DISCLOSURE

The present invention refers to a caliper body for a disc brake, for example for a motor vehicle, to a caliper for a disc brake comprising such a caliper body, as well as to a mould and to a method for obtaining such a caliper body.

BACKGROUND

Generally, in disc brakes, the brake caliper is arranged astride of the outer peripheral edge of a brake disc. The brake caliper usually comprises a body having two elongated elements that are arranged so as to face opposite braking surfaces of a disc. Between each elongated element of the caliper and the braking surfaces of the brake disc there are friction pads. At least one of the elongated elements of the body of the caliper has cylinders suitable for receiving hydraulic pistons capable of exerting a thrusting action on the pads, abutting them against the braking surfaces of the disc to exert a braking action on the vehicle.

The brake calipers are usually fixedly connected to a support structure that remains fixed to the vehicle, like for example an axle-journal of a vehicle's suspension.

In a typical arrangement, one of the two elongated elements has two or more attachment portions of the body of the caliper to the support structure, for example providing slots or eyelets, for example arranged axially, or through holes, for example arranged radially, suitable for receiving screws for fixing the caliper that, with their ends are received in threaded holes provided on the support of the caliper.

In a typical construction of a caliper body, the elongated elements arranged facing the braking surfaces of the disc are connected together by bridge elements arranged astride of the disc.

A caliper body of this type is described in EP-A-2022999. FIG. 1 of EP-A-2022999 shows a caliper body of the fixed caliper type. This caliper body is of the monoblock type comprising two elongated elements the ends of which are connected together by bridges. Stiffening shafts extend between the elongated elements and between the two bridges forming a cross structure.

Typically, the body of the caliper is made from metal like for example aluminium, or aluminium alloy or cast iron. The body of the caliper can be obtained by casting, but also by chip-removal machining, as well as by forging.

The body of the caliper can be produced in a single piece or monoblock, but also in two half-calipers typically connected together along a plane that usually coincides with a middle plane of the disc on which the caliper is arranged astride.

In the case in which the driver of an automobile wishes to brake or slow down the movement of the vehicle, he applies a force on the brake pedal. Such a force on the brake pedal, through a brake pump, exerts a pressure on the brake fluid that, through a duct, is applied to the brake fluid present in the hydraulic circuit arranged inside the body of the caliper until the cylinders are reached where the pressure is exerted on the surface of the bottom of the pistons, forcing them to clamp against the pads that, in turn, abut against the braking surfaces of the disc.

The pressure action of the brake fluid also acts on the bottom wall of the cylinder causing a reaction in the caliper body that axially deforms it away from the surfaces of the disc. This deformation of the caliper body leads to an increase in the stroke of the pistons and therefore to an increase in the stroke of the brake pedal.

The body of the caliper also deforms as a function of the torque, exerted by the action of the pistons that abut the pads against the braking surfaces of the disc, which applies a deformation moment in directions that form torque arms with respect to the attachment points of the caliper body to its support. Such a torque deforms the caliper body also in a tangential and radial direction with respect to the disc.

Moreover, in cases in which the caliper body comprises two half-calipers, a high tension zone is created at the joining plane of the two half-calipers, which, as stated earlier, usually coincides with the middle plane of the disc on which the caliper is arranged astride.

At such a middle plane, both in monoblock caliper bodies and in caliper bodies comprising two half-calipers, there is a build-up of the tensions due to the aforementioned torque effects and the tensions generated by the pressure of the pads i.e. by the axial deformation. In the case of caliper bodies comprising two half-bodies, these tensions are added to by the tension caused by the screw tightening at the same plane. In other words, the screw that joins the two half-calipers generates a pulling tension at the joining plane of the two half-calipers that adds to the aforementioned tensions, creating a critical zone.

The caliper body must therefore have a sufficient structural rigidity, so as to ensure that the deformation of the caliper body caused by the braking action is kept within tolerable values, so as to avoid damaging the braking system and not to give the driver the feeling of having a non-responsive braking system, determining an extra stroke of the lever or pedal of the braking system and creating a feeling of a "spongy" system. This requirement pushes towards having extremely rigid structures for the caliper bodies and thus increasing their bulk and weight, especially in the most critical areas.

On the other hand, the caliper body, being fixedly connected to the vehicle's suspension and being arranged astride of the disc, is one of the non-suspended masses that it is wished to reduce as much as possible to increase the performance of the vehicle.

Such considerations are extremely important when the vehicle is a racing vehicle and the user wishes to have a braking system that is extremely responsive to his commands and at the same time is extremely light so as not to penalise the performance of the racing vehicle.

There is therefore a need for a caliper body for a disc brake that has improved structural characteristics for the same weight of the caliper body, or else one with the same structural characteristics that is lighter than the solutions of the prior art.

There are known solutions for caliper bodies specially studied to increase the characteristics of structural rigidity. For example, the aforementioned patent application EP-A-2022999, international patent application PCT/EP2005/050615 and American patent U.S. Pat. No. 3,183,999 all have solutions for caliper bodies equipped with reinforcement elements, for example arranged around the caliper bodies. In some of these known solutions the caliper body is of the symmetrical type according to planes passing through the axis of the disc or through the middle of the disc. In other solutions the caliper body has large and distributed windows, possibly passing right through, which form elongated reinforcement elements arranged longitudinally to the caliper body.

Although satisfactory from various points of view, these known solutions do not allow achieving structures that maximise the structural rigidity of the caliper body, reducing its weight and at the same time keeping the bulk as low as possible so as to facilitate the mounting of the caliper body also inside rims and wheels on which brake discs having a large diameter are mounted.

SUMMARY

A purpose of the present invention is therefore to provide a caliper body for a disc brake that has high structural rigidity and, at the same time, low weight and bulk.

These and further purposes are achieved through a caliper body as described herein, as well as by a caliper also as described herein.

In particular, in accordance with a first aspect thereof, the invention concerns a caliper body for a disc brake, suitable for being arranged astride of a disc for a disc brake, said disc defining a first braking surface and a second braking surface opposite the first braking surface; said caliper body comprising a first half-caliper and a second half-caliper, which are obtained by casting without machining and are suitable for being connected together at respective contact surfaces defining a joining plane of the half-calipers; said first half-caliper comprising a wheel-side elongated portion, extending in the tangential direction, which is suitable for facing its axially inner surface towards the first braking surface, and at least one first projecting portion, projecting in the axial direction provided with a first contact surface suitable for connection with the second half-caliper; said second half-caliper comprising a vehicle-side elongated portion, extending in the tangential direction, which is suitable for facing its axially inner surface towards the second braking surface, an attachment portion suitable for being connected to a support for the caliper and at least one second projecting portion, projecting in the axial direction provided with a second contact surface suitable for connection with the first half-caliper;

the first projecting portion and the second projecting portion being suitable for being connected together at the respective contact surfaces so as to form at least one bridge astride of the disc;

each of said first projecting portion and said second projecting portion being provided with a radially inner surface suitable for facing the disc that forms an angle α of between 90° and 92° with the respective contact surface; in which the first projecting portion extends farther in the axial direction with respect to the second projecting portion so that said half-caliper joining plane is axially closer to the vehicle-side elongated portion with respect to the wheel-side elongated portion. In the present context, the term "without machining" indicates absence of correction of the draft angles.

Therefore, such a term does not exclude further machining that could be necessary, such as the perforation for obtaining the seats of the cylinders, the boring of the holes, the deep perforation for obtaining ducts for the brake fluid, the milling of the resting surfaces of the pads or of the contact surfaces of the two half-calipers. The combination of the aforementioned characteristics makes it possible to achieve a caliper body with high mechanical strength, having low bulk and weight and with low production costs.

In particular, the characteristics according to which the first projecting portion extends farther in the axial direction with respect to the second projecting portion makes it possible to move the joining plane of the two half-calipers into an area closer to the vehicle-side elongated portion in which it is possible to increase the section of the half-caliper in the radial direction without causing problems of bulk. Moreover, in this way it is possible to reduce the section of the half-caliper in the radial direction near the wheel-side elongated portion, i.e. in the area in which it is advantageous to have a small section due to bulk problems. Moreover, such a characteristic makes it possible to move the tension due to the connection of the two half-calipers into an area without other tension and thus to increase the overall rigidity of the structure.

The characteristic according to which the radially inner surface of the projecting portion suitable for facing the disc forms an angle α of between 90° and 92° with the respective contact surface, makes it possible to obtain, the remaining geometric characteristics being the same, a larger contact surface between the two half-calipers and therefore an improved mechanical strength. Moreover, such a characteristic gives a production process of the caliper body that is faster and more cost-effective since it makes it possible to avoid processing after mould stripping that often becomes necessary to correct the draft angles.

The combination of such characteristics gives improved rigidity for the same bulk and weight or a decreased bulk and weight for the same rigidity, as well as a fast and cost-effective production process.

In accordance with a preferred embodiment of the invention, the angle α is between 90° and 91° and even more preferably it is between 90° and 90.5°. In accordance with a further embodiment, such an angle α is substantially a right angle.

In this way, the aforementioned advantageous effects are amplified.

In accordance with one embodiment of the invention, said second projecting portion has a negligible axial extension with respect to the axial extension of the first projecting portion. In this way it is possible to move the joining plane of the half-calipers so as to make it coincide with the bottom plane of the cavity for housing the pad and to optimise the position of such a plane in terms of rigidity and of bulk.

Preferably, at least one from said first half-caliper and said second half-caliper is obtained by casting in a mould comprising at least one figure having an inclined axis with respect to the axis of the mould.

In this way, it is possible to avoid, in a simple manner, the formation of draft angles and obtain the desired angle α without subsequent machining.

According to one embodiment of the invention, said first half-caliper and said second half-caliper are connected through threaded connection means.

Preferably, said first projecting portions and said second projecting portions are two in number so as to form two bridges astride of the disc.

In accordance with one embodiment, at least one from said wheel-side elongated portion and said vehicle-side elongated portion is provided with at least one cavity suitable for housing or forming at least one cylinder suitable for receiving a piston for exerting a pressure on at least one pad housed between the respective elongated portion and the respective braking surface.

Preferably, each of said wheel-side elongated portion and said vehicle-side elongated portion is provided with said at least one cavity. In this case it is possible to obtain a fixed caliper.

According to one embodiment of the invention, the outer profile of the first half-caliper is bevelled. In this way it is possible to reduce the bulk of the caliper body as much as possible.

In accordance with a second aspect thereof, the invention concerns a caliper for a disc brake comprising a caliper body as described earlier.

In accordance with a third aspect thereof, the invention concerns a kit comprising a caliper for a disc brake as described earlier and a brake disc.

Preferably, in such a kit the joining plane of the half-calipers is axially offset from the middle plane of said disc.

In accordance with a further aspect thereof, the present invention concerns a mould for obtaining at least one first half-caliper and one second half-caliper for a caliper body of a disc brake, as described earlier.

Such a mould achieves the same advantages mentioned above.

It preferably comprises at least one figure having an inclined axis with respect to the axis of the mould itself.

In accordance with a further aspect thereof, the present invention concerns a method for obtaining a caliper body for a disc brake, as described earlier, by casting without machining comprising the steps of:
pulling out a first half-caliper and a second half-caliper from a mould comprising at least one figure having an inclined axis with respect to the axis of the mould itself;
joining said first half-caliper and said second half-caliper.

BRIEF DESCRIPTION OF THE DRAWINGS

Further characteristics and advantages of the invention will become clear from the following description of some preferred examples of the caliper body, caliper, kit, mould and method for producing the caliper body according to the invention, made—for indicating and not limiting purposes—with reference to the attached drawings, in which:

FIG. 2b shows a view of the caliper body along the section A-A of FIG. 2a;

FIG. 3 shows an exploded axonometric view of the caliper body represented from the vehicle side according to one embodiment of the invention;

FIG. 4 shows an exploded axonometric view of the caliper body associated with further elements represented from the wheel side according to one embodiment of the invention;

DETAILED DESCRIPTION

Figure 2A:
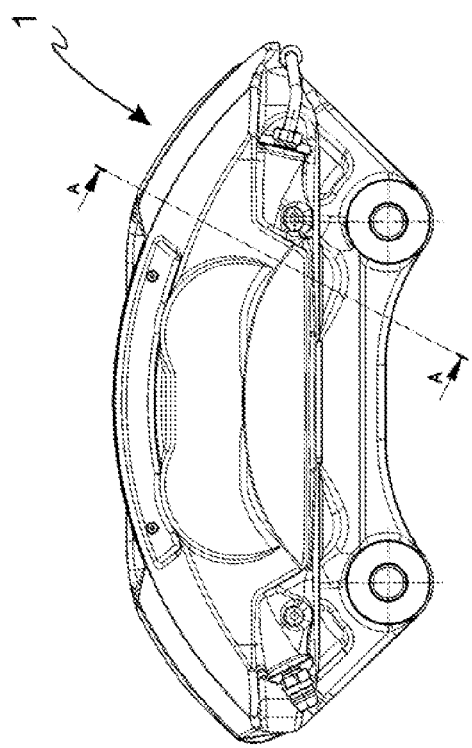
FIG. 2a shows a side view of the caliper body from the vehicle side according to one embodiment of the invention.
Figure 2B:
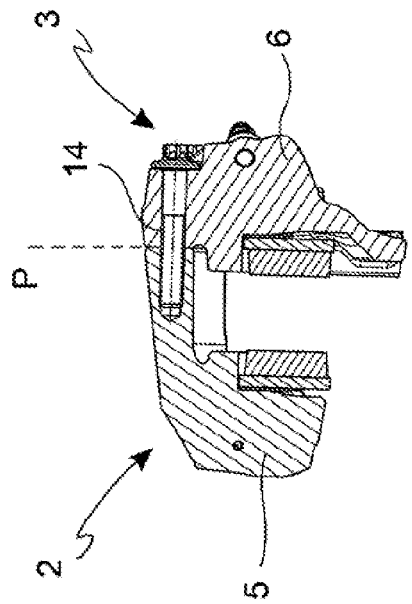
Figure 1:
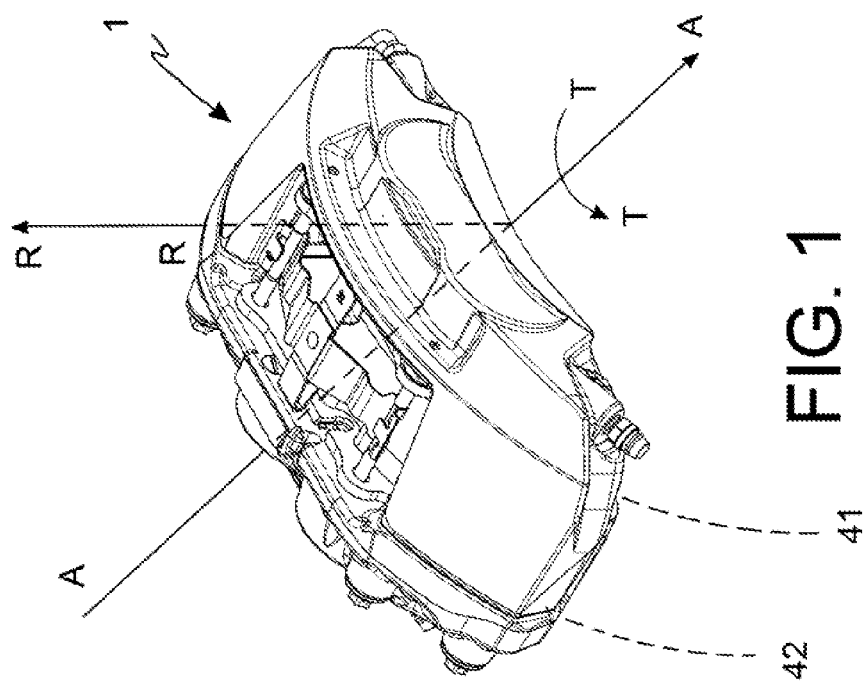
FIG. 1 shows an axonometric view of the caliper body for a disc brake according to one embodiment of the invention represented from above and from the wheel side.

With reference to such figures, a caliper body 1 for a disc brake suitable for being arranged astride of a disc 40 for a disc brake is wholly indicated with 1.

Said disc 40 defines a first braking surface 41 and a second braking surface 42, opposite the first braking surface 41.

The disc 40 defines an axial direction, indicated in the figures with the axis A-A, parallel to a rotation axis thereof, as well as a tangential or circumferential direction, indicated in the figures with T-T and parallel to one of its braking surfaces 41, 42. Said disc 40 also defines a radial direction, indicated in the figures with R-R, arranged perpendicular to the axial direction A-A and to the circumferential or tangential direction T-T.

The caliper body 1 comprises a first half-caliper 2 and a second half-caliper 3, obtained by casting without machining.

Such half-calipers are suitable for being connected together at respective contact surfaces 4', 4" that, with connection complete, define a joining plane P of the half-calipers.

The first half-caliper 2 comprises a wheel-side elongated portion 5, which extends in the tangential direction and is suitable for facing its axially inner surface towards the first braking surface 41. The first half-caliper 2 also comprises at least one first projecting portion 11, projecting in the axial direction and towards the disc 40 that is provided with a first contact surface 4' suitable for connecting with the second half-caliper 3.

The second half-caliper 3 comprises a vehicle-side elongated portion 6, which extends in the tangential direction and is suitable for facing its axially inner surface towards the second braking surface 42. Such a second half-caliper 3 also comprises an attachment portion 7 suitable for being connected to a support for the caliper, for example, but not necessarily, a portion defining a through hole suitable for receiving means for fixing the caliper body 1 to a support structure of the caliper body 1 itself, for example an axle-journal of a vehicle's suspension.

The second half-caliper 3 also comprises at least one second projecting portion 12, projecting in the axial direction and towards the disc 40 provided with a second contact surface 4" suitable for connecting with the first half-caliper 2.

The first projecting portion 11 and the second projecting portion 12 are suitable for being connected together at the respective contact surfaces 4', 4" so as to form at least one bridge astride of the disc 40.

Moreover, according to the present invention, each of said first projecting portion 11 and said second projecting portion 12 is provided with a radially inner surface 13', 13" suitable for facing the disc 40 that forms an angle α of between 90° and 92°, preferably between 90° and 91° and even more preferably between 90° and 90.5° with the respective contact surface 4', 4". Advantageously such an angle is substantially a right angle.

According to the invention, the first projecting portion 11 extends farther in the axial direction with respect to the second projecting portion 12 so that said half-caliper joining plane P is axially closer to the vehicle-side elongated portion 6 with respect to the wheel-side elongated portion 5.

Preferably, the second projecting portion 12 has a negligible axial extension with respect to the axial extension of the first projecting portion 11, i.e. the first projecting portion 11 forms, by itself, the bridge astride of the disc 40.

As it may be seen in the figures, the second projecting portion 12 has substantially zero axial extension.

The wheel-side elongated portion 5 is preferably provided with at least one cavity 8 that houses, or forms, at least one cylinder 9. According to the embodiment shown in the figures, there are two of such cavities 8, each housing a cylinder 9. Each cylinder 9 is suitable for receiving a piston to exert a pressure on at least one pad 8 arranged, or housed, between said wheel-side elongated portion 5 and said first braking surface 41 of the disc 40.

Said vehicle-side elongated portion 6, in turn, is provided with at least one cavity 8 that houses, or forms, at least one cylinder 9. Preferably, but not necessarily, there are two cavities 8, each housing a cylinder 9, suitable for receiving a piston for exerting a pressure on at least one pad 10 arranged, or housed, between said vehicle-side elongated portion 6 and said second braking surface 42 of the disc 40.

The pads advantageously comprise support plates for friction gaskets.

Channels are present in the caliper body 1 in a totally conventional manner to allow brake fluid to be fed to the cylinders 9. Each cylinder 9 is preferably provided with an annular groove suitable for containing a sealing gasket, of the known type.

As can be seen in FIG. 4, the caliper body 1 also comprises gaskets and dust covers of the known type.

In accordance with the embodiment shown in the figures, there are two first projecting portions 11 and two second projecting portions 12 and, once connected, they form two bridges astride of the disc 40.

The first half-caliper 2 and the second half-caliper 3 are connected by means of a threaded connection means 14. In the embodiment shown in the figures, there are four threaded connection means 14.

Preferably, the first half-caliper 2 has an outer profile that is bevelled, cut or drafted so as to form areas with reduced thickness.

Preferably, at least one of the bridges formed by the projecting portions 11, 12, in a portion thereof close to the wheel-side elongated portion 5 and/or in a portion thereof close to the vehicle-side elongated portion 6, has an undercut or lightening groove 15.

In accordance with one embodiment, both of the bridges have such lightening grooves 15.

Advantageously, at least one from the first half-caliper 2 and the second half-caliper 3 is obtained by casting in a mould 16 comprising at least one configuration 17 having an axis I inclined with respect to the axis S of the mould. In the present context, the axis of the mould indicates the direction of opening of the mould, the configuration of the mould indicates the housing inside the suitably shaped mould that houses the material for obtaining the half-caliper and the axis of the configuration indicates the axis parallel to the direction of motion of the pistons during use, as known in the field.

The casting preferably takes place through shell casting.

The mould 16 according to the present invention is suitable for obtaining at least one first half-caliper 2 and at least one second half-caliper 3, for which reason it comprises at least two configurations 17, each relative to a half-caliper, however it preferably comprises four configuration 17.

Figure 9:
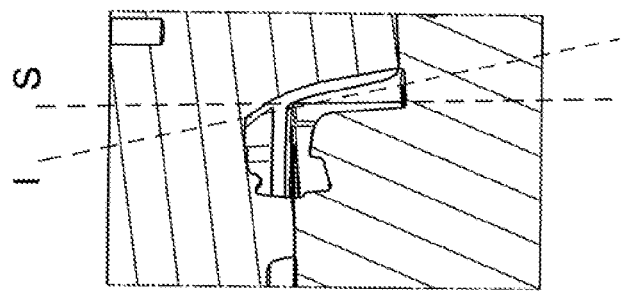
FIG. 9 shows a view along the section B-B of FIG. 8.
Figure 8:
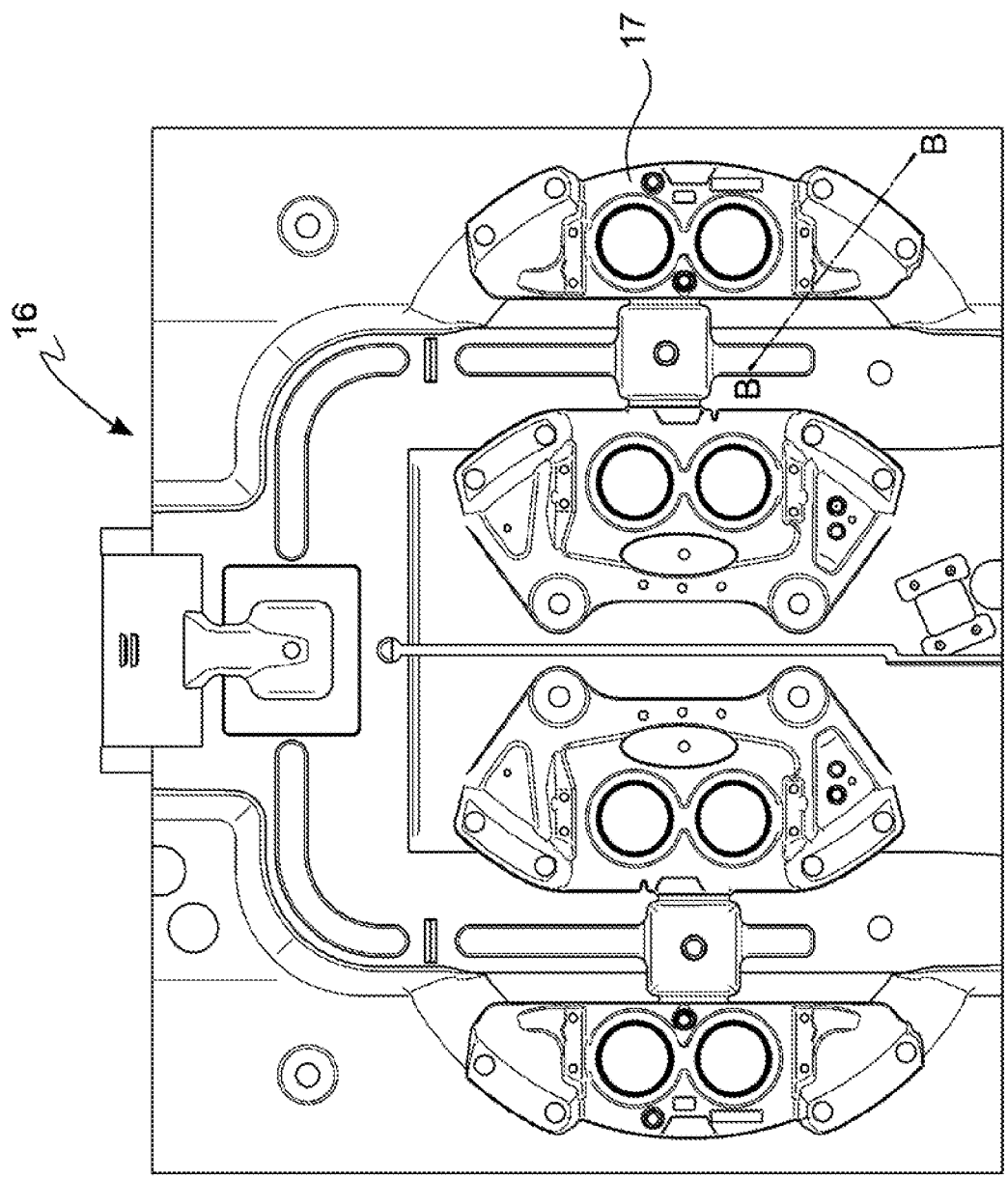
FIG. 8 shows a view from above of the mould according to one embodiment of the invention.

As it may be seen in FIGS. 8 and 9, the mould 16 comprises at least one configuration 17 having an axis I inclined with respect to the axis S of the mould itself.

Figure 5:
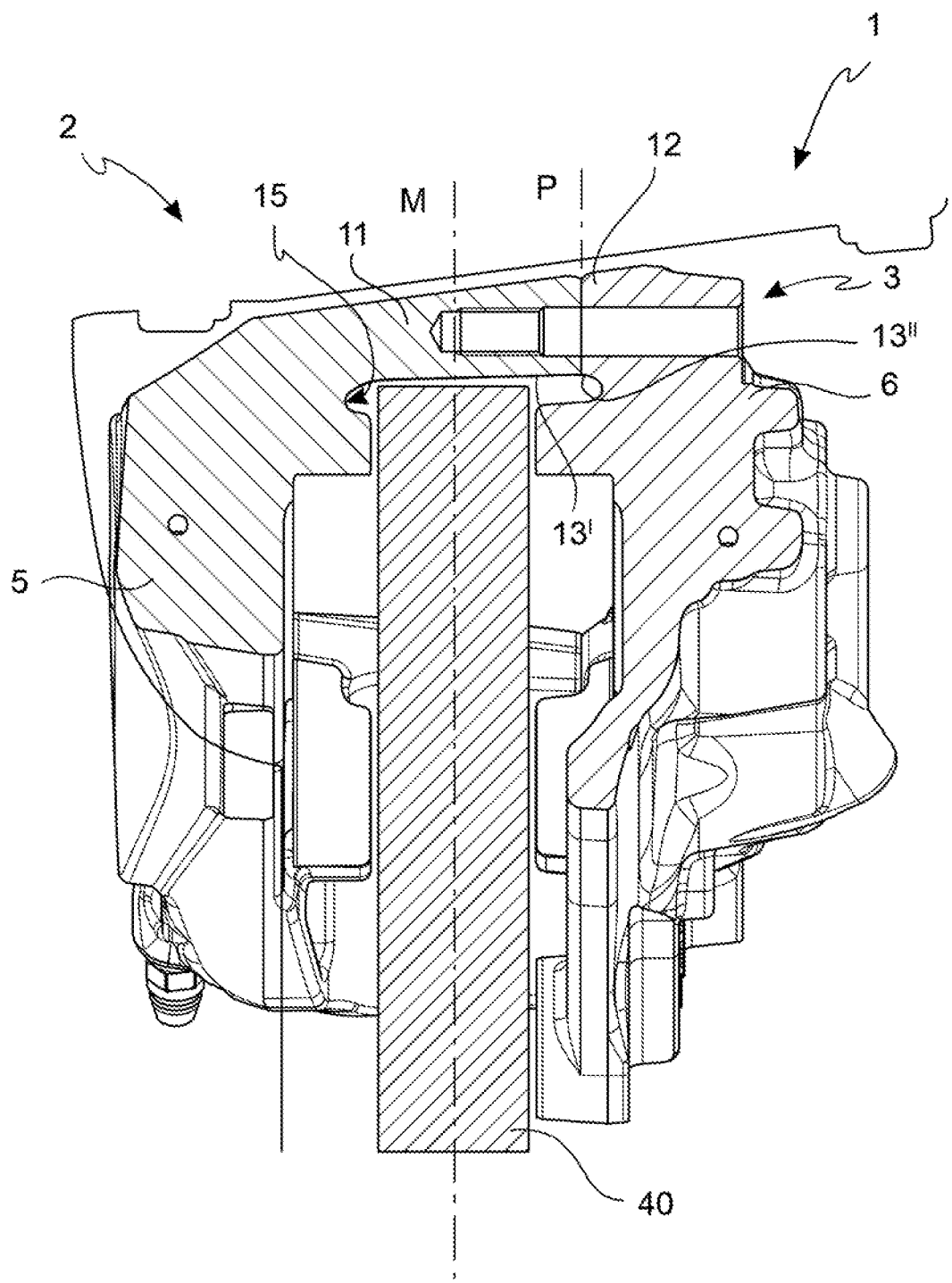
FIG. 5 shows a schematic section view of the kit according to one embodiment of the invention.
Figure 6:
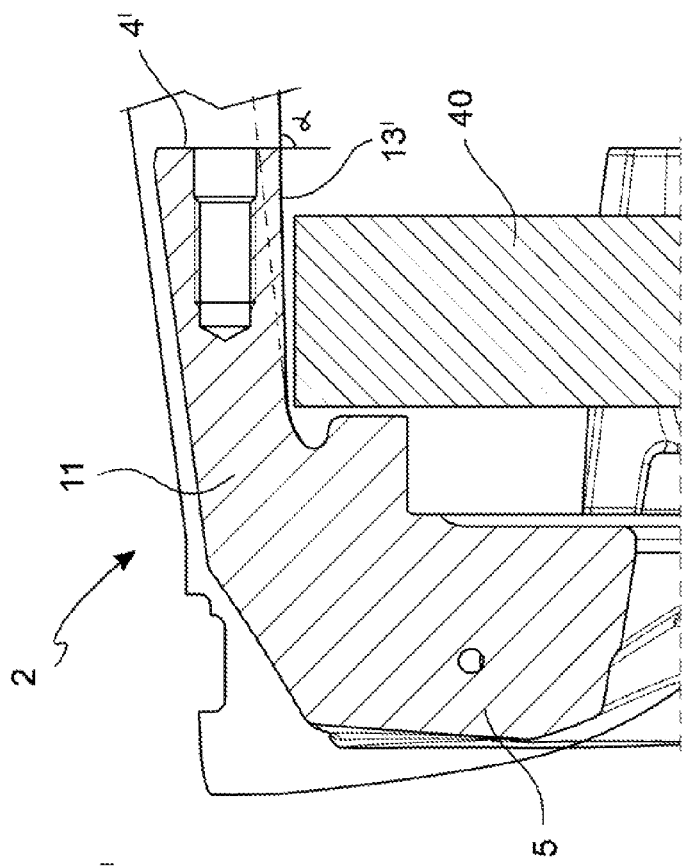
FIG. 6 shows a detail of FIG. 5.
Figure 7:
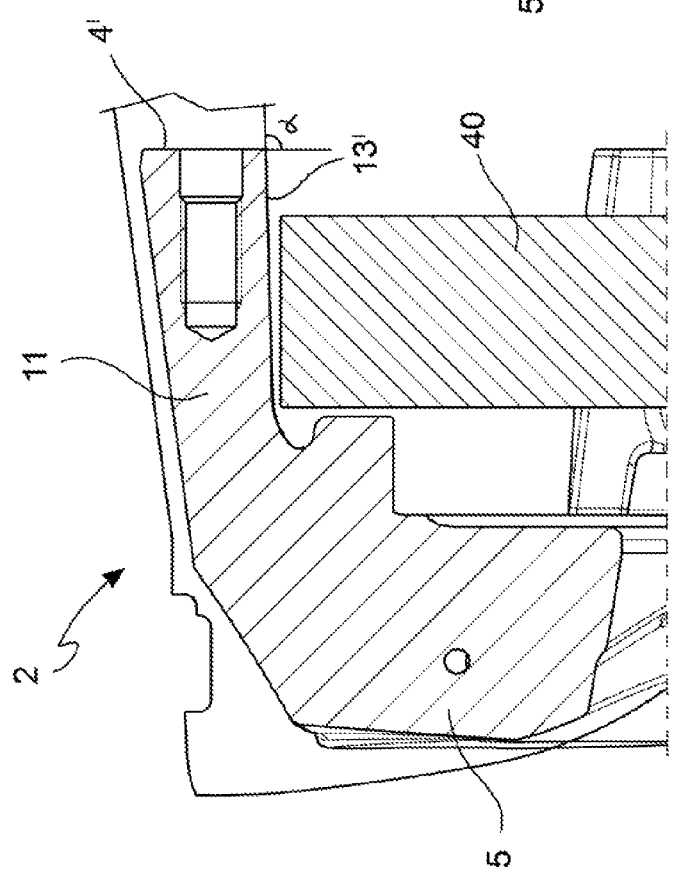
FIG. 7 shows the detail of FIG. 6 (with a full line) compared with the prior art (broken line)

FIG. 5 schematises a kit comprising a caliper provided with a caliper body 1 and a disc 40.

As it may be seen in such a figure, the joining plane P of the half-calipers is axially offset from the middle plane M of the disc 40.

Thanks to the caliper body 1 as described above, it is possible to obtain a structure that is particularly resistant to the high stresses generated by sudden braking.

At the same time, thanks to the characteristics of the caliper body 1 described above, the caliper stressed with maximum braking will have extremely low deformation that avoids undesired strokes of the brake pedal lever, giving the user the sensation of extreme responsiveness of the braking system.

At the same time, thanks to the caliper body 1 as described above, the overall weight of the caliper is reduced.

Moreover, thanks to the caliper body as described above it is possible to substantially reduce the overall bulk for the same characteristics of rigidity or weight.

According to the present invention, the method for obtaining a caliper body 1 for a disc brake by casting without machining comprises the steps of:
pulling out a first half-caliper 2 and a second half-caliper 3 from a mould comprising at least one configuration 17 having an axis I inclined with respect to the axis S of the mould itself;
joining said first half-caliper 2 and said second half-caliper 3.

Preferably, the step of joining said first half-caliper 2 and said second half-caliper 3 is carried out through at least one threaded connection means 14.

Thanks to such a method it is possible to obtain the aforementioned advantages, achieving speed and cost-effectiveness of the production process.

A man skilled in the art may make modifications, adaptations and replacements of elements with functionally equivalent ones to the embodiments described above, in order to satisfy contingent requirements, without for this reason departing from the scope of the following claims. Each of the characteristics described as belonging to a possible embodiment can be made independently of the other embodiments described.

In the present description above and in the subsequent claims, all of the numerical values indicating amounts, parameters, percentages, and so on should be considered in all circumstances to be preceded by the term "about" unless indicated otherwise. Moreover, all of the ranges of numerical magnitudes include all of the possible combinations of maximum and minimum numerical values and all of the possible intermediate ranges, as well as those specifically indicated in the text.

The invention claimed is:

1. Caliper body for a disc brake, suitable for being arranged astride of a disc for a disc brake, said disc defining a first braking surface and a second braking surface opposite the first braking surface;
comprising a first half-caliper and a second half-caliper, each half-caliper configured to be a fixed caliper to be fixed in place upon installation, and which are obtained by casting without machining and are suitable for being connected together at respective contact surfaces, said contact surfaces defining a joining plane (P) of the half-calipers;
said first half-caliper comprising a wheel-side elongated portion, extending in a tangential direction, which is suitable for facing its axially inner surface towards the first braking surface, and at least one first projecting portion projecting in an axial direction provided with a first contact surface suitable for connecting with the second half-caliper;
said second half-caliper comprising a vehicle-side elongated portion, extending in a tangential direction, which is suitable for facing its axially inner surface towards the second braking surface, an attachment portion suitable for being connected to a support for the caliper and at least one second projecting portion projecting in an axial direction provided with a second contact surface suitable for connection with the first half-caliper;

the first projecting portion and the second projecting portion being suitable for being connected together at the respective contact surfaces so as to form at least one bridge astride of the disc;
each of said first projecting portion and said second projecting portion being provided with a radially inner surface suitable for facing the disc which forms an angle α in the range of greater than 90° up to 92° with the respective contact surface;
wherein the first projecting portion extends farther in the axial direction with respect to the second projecting portion so that said half-caliper joining plane (P) is axially closer to the vehicle-side elongated portion with respect to the wheel-side elongated portion, and
wherein said wheel-side elongated portion and said vehicle-side elongated portion are provided with at least one cavity suitable for housing or forming at least one cylinder suitable for receiving a piston to exert a pressure on at least one pad housed between the respective elongated portion and the respective braking surface.

2. Caliper body according to claim 1, wherein said angle α is in the range of greater than 90° up to 91° with the respective contact surface.

3. Caliper body for a disc brake, suitable for being arranged astride of a disc for a disc brake, said disc defining a first braking surface and a second braking surface opposite the first braking surface;
comprising a first half-caliper and a second half-caliper, each half-caliper configured to be a fixed caliper to be fixed in place upon installation, and which are obtained by casting without machining and are suitable for being connected together at respective contact surfaces, said contact surfaces defining a joining plane (P) of the half-calipers;
said first half-caliper comprising a wheel-side elongated portion, extending in a tangential direction, which is suitable for facing its axially inner surface towards the first braking surface, and at least one first projecting portion projecting in an axial direction provided with a first contact surface suitable for connecting with the second half-caliper;
said second half-caliper comprising a vehicle-side elongated portion, extending in a tangential direction, which is suitable for facing its axially inner surface towards the second braking surface, an attachment portion suitable for being connected to a support for the caliper and at least one second projecting portion projecting in an axial direction provided with a second contact surface suitable for connection with the first half-caliper;
the first projecting portion and the second projecting portion being suitable for being connected together at the respective contact surfaces so as to form at least one bridge astride of the disc;
each of said first projecting portion and said second projecting portion being provided with a radially inner surface suitable for facing the disc which forms an angle α of between 90° and 92° with the respective contact surface; and
wherein the first projecting portion extends farther in the axial direction with respect to the second projecting portion so that said half-caliper joining plane (P) is axially closer to the vehicle-side elongated portion with respect to the wheel-side elongated portion;
wherein said second projecting portion has a negligible axial extension with respect to the axial extension of the first projecting portion, such that the first projecting portion forms by itself the at least one bridge by itself, and
wherein said wheel-side elongated portion and said vehicle-side elongated portion are provided with at least one cavity suitable for housing or forming at least one cylinder suitable for receiving a piston to exert a pressure on at least one pad housed between the respective elongated portion and the respective braking surface.

4. Caliper body for a disc brake, suitable for being arranged astride of a disc for a disc brake, said disc defining a first braking surface and a second braking surface opposite the first braking surface;
comprising a first half-caliper and a second half-caliper, which are obtained by casting without machining and are suitable for being connected together at respective contact surfaces, said contact surfaces defining a joining plane (P) of the half-calipers;
said first half-caliper comprising a wheel-side elongated portion, extending in a tangential direction, which is suitable for facing its axially inner surface towards the first braking surface, and at least one first projecting portion projecting in an axial direction provided with a first contact surface suitable for connecting with the second half-caliper;
said second half-caliper comprising a vehicle-side elongated portion, extending in a tangential direction, which is suitable for facing its axially inner surface towards the second braking surface, an attachment portion suitable for being connected to a support for the caliper and at least one second projecting portion projecting in an axial direction provided with a second contact surface suitable for connection with the first half-caliper;
the first projecting portion and the second projecting portion being suitable for being connected together at the respective contact surfaces so as to form at least one bridge astride of the disc;
each of said first projecting portion and said second projecting portion being provided with a radially inner surface suitable for facing the disc which forms an angle α of between 90° and 92° with the respective contact surface;
wherein the first projecting portion extends farther in the axial direction with respect to the second projecting portion so that said half-caliper joining plane (P) is axially closer to the vehicle-side elongated portion with respect to the wheel-side elongated portion; and
wherein at least one of said first half-caliper and said second half-caliper is configured having an axis (I) inclined with respect to an axis (S) of a mould in which the at least one of said first half-caliper and said second half-caliper is cast.

5. Caliper body according to claim 1, wherein said first half-caliper and said second half-caliper are connected through threaded connection means.

6. Caliper body according to claim 1, wherein said at least one first projecting portion and said second at least one projecting portion form two bridges astride of the disc.

7. Caliper body according to claim 1, wherein the outer profile of the first half-caliper is bevelled.

8. Caliper body according to claim 1, wherein the angle α is less than 92°.

9. Caliper body according to claim 4,
wherein said wheel-side elongated portion or said vehicle-side elongated portion is provided with at least one cavity suitable for housing or forming at least one cylinder suitable for receiving a piston for exerting a pressure on at least one pad housed between the respective elongated portion and the respective braking surface, the cavity having an axis indicating a direction of motion of the piston,
wherein the axis (S) of the mould indicates a direction of opening of the mould, and the axis (I) of the at least one of said first half-caliper and said second half-caliper is parallel to the direction of motion of the piston during use.

* * * * *